(12) United States Patent
Nojiri et al.

(10) Patent No.: US 11,332,068 B2
(45) Date of Patent: May 17, 2022

(54) DIRECTION INDICATOR CONTROL METHOD AND DIRECTION INDICATOR CONTROL DEVICE

(71) Applicant: Nissan Motor Co., Ltd., Yokohama (JP)

(72) Inventors: Takahiro Nojiri, Kanagawa (JP); Tatsuya Shino, Kanagawa (JP); Katsuhiko Degawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 410 days.

(21) Appl. No.: 16/624,641

(22) PCT Filed: Jun. 26, 2017

(86) PCT No.: PCT/JP2017/023417
§ 371 (c)(1),
(2) Date: Dec. 19, 2019

(87) PCT Pub. No.: WO2019/003277
PCT Pub. Date: Jan. 3, 2019

(65) Prior Publication Data
US 2020/0122632 A1 Apr. 23, 2020

(51) Int. Cl.
*B60Q 1/40* (2006.01)
*B60Q 1/34* (2006.01)

(52) U.S. Cl.
CPC ............... *B60Q 1/40* (2013.01); *B60Q 1/346* (2013.01)

(58) Field of Classification Search
CPC .......... B60Q 1/40; B60Q 1/346; G01C 21/36; G01C 21/3632; G01C 21/3658; G08G 1/0969

USPC .......................................................... 701/36
See application file for complete search history.

(56) References Cited

U.S. PATENT DOCUMENTS

| | | | | |
|---|---|---|---|---|
| 6,934,627 B2* | 8/2005 | Kawakami | ......... | G01C 21/3632 701/437 |
| 7,539,574 B2* | 5/2009 | Takashima | ......... | G01C 21/3632 340/995.25 |
| 10,854,083 B2* | 12/2020 | Kumano | ................ | B60W 40/02 |
| 2003/0236616 A1* | 12/2003 | Kawakami | ......... | G01C 21/3632 701/468 |

(Continued)

FOREIGN PATENT DOCUMENTS

| FR | 2913930 B1 | 5/2009 |
|---|---|---|
| JP | 2001-336944 A | 12/2001 |

(Continued)

OTHER PUBLICATIONS

Hjfocus "Do you know how to use the correct roundabout?", Jun. 22, 2017, 2 pages, retrieved from URL: http://www.hjfocus.com/news/articleView.html?idxno=583.

(Continued)

*Primary Examiner* — Eric Blount
(74) *Attorney, Agent, or Firm* — Young Basile Hanlon & MacFarlane, P.C.

(57) ABSTRACT

A direction indicator control unit inhibits direction indicators of a host vehicle from making a directional indication when the host vehicle enters a roundabout determined to be present along a presumed traveling route on which the host vehicle is presumed to travel. A direction indicator control method also inhibits direction indicators.

8 Claims, 8 Drawing Sheets

(56) References Cited

U.S. PATENT DOCUMENTS

| | | | |
|---|---|---|---|
| 2006/0217882 A1* | 9/2006 | Takashima | G01C 21/3632 701/457 |
| 2016/0161271 A1* | 6/2016 | Okumura | B60W 30/09 701/25 |
| 2020/0363228 A1* | 11/2020 | Nojiri | G01C 21/3632 |

FOREIGN PATENT DOCUMENTS

| | | |
|---|---|---|
| JP | 2006-242905 A | 9/2006 |
| JP | 2008-189216 A | 8/2008 |
| JP | 2012-149957 A | 8/2012 |
| JP | 2016-138866 A | 8/2016 |
| WO | 2008125392 A1 | 10/2008 |

OTHER PUBLICATIONS

"Roundabout Basics", Oct. 24, 2015, 8 pages, retrieved from URL: https://www.youtube.com/watch?v=35XgSJ-hSdo.

Nagano-Ken Keisatsu, Kanjo Kosaten (Roundabout) 1-4 no Kotsu Hoho nl Tsuite, Mar. 5, 2015 (Mar. 5, 2015), [retrieval date Aug. 8, 2017 (Aug. 8, 2017)], Internet URL: http://www.pref.nagano.lg.jp/police/anshin/koutsu/roundabout.html; with translation; 7 pages.

FZichannel: "Motion Planning for the S 500 Intelligent Drive (Explanatory Video)", Feb. 10, 2014 (Feb. 10, 2014), page I, Retrieved from the Internet: URL: https://www.youtube.com/watch?v=GfXg9ux4xUw; retreived May 25, 2020.

\* cited by examiner

DIRECTION INDICATOR CONTROL METHOD AND DIRECTION INDICATOR CONTROL DEVICE

TECHNICAL FIELD

The present invention relates to a direction indicator control method and a direction indicator control device.

BACKGROUND

Route guiding technology at a circular intersection is known that displays an arrow indicating a traveling direction toward a road to exit at each point branching into the corresponding connected road.

SUMMARY

The above technology relates to the route guidance at the circular intersection referred to as a roundabout. The rules at a roundabout typically differ from the rules at other intersections such as a crossroads. The above technology may not be applicable to directional indication at a roundabout while following the rules of the roundabout.

To solve the above conventional problem, the present invention provides a direction indicator control method and a direction indicator control device enabling directional indication following rules of a corresponding roundabout.

A direction indicator control unit according to an aspect of the present invention inhibits a direction indicator of a vehicle from making a directional indication when the vehicle enters a roundabout determined to be present along a presumed traveling route on which the vehicle is presumed to travel.

The present invention enables the directional indication following rules of a corresponding roundabout.

DETAILED DESCRIPTION

An embodiment of the present invention will be described in detail below with reference to the drawings. The same elements are indicated by the same reference numerals, and overlapping explanations are not repeated below.

Figure 1:
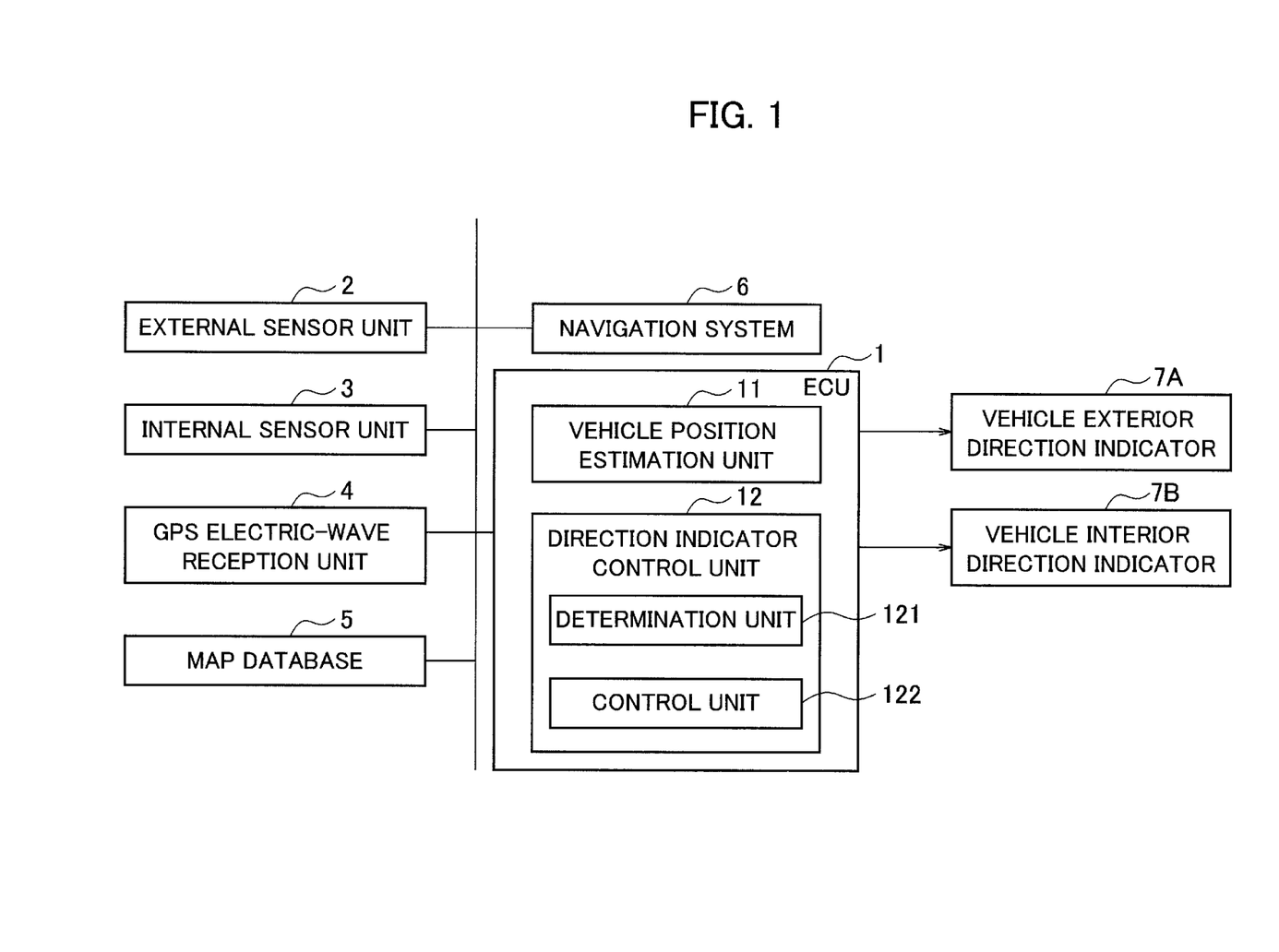
FIG. 1 is a functional block diagram illustrating part of a vehicle equipped with a direction indicator control device according to an embodiment of the present invention.

A vehicle shown in FIG. 1 includes an electronic control unit (ECU) 1, an external sensor unit 2, an internal sensor unit 3, a global positioning system (GPS) electric-wave reception unit 4, a map database 5, a navigation system 6, a vehicle exterior direction indicator 7A, and a vehicle interior direction indicator 7B. The vehicle shown in FIG. 1 is referred to as a "host vehicle" as necessary so as not to be confounded with other vehicles. The vehicle exterior direction indicator 7A and the vehicle interior direction indicator 7B are also collectively referred to as "direction indicators".

The ECU 1, corresponding to a determination unit and a control circuit in a direction indicator control device, can be implemented by a microcomputer including a central processing unit (CPU), a memory, and an input-output unit. A computer program for fabricating the ECU is installed on the microcomputer and is executed, so that the microcomputer functions as the ECU 1. While the embodiment is illustrated with the case in which the software is installed to fabricate the ECU 1, dedicated hardware for executing each information processing as described below can be prepared to compose the ECU 1.

The external sensor unit 2 includes a radar unit or a camera (not shown) for acquiring surrounding information of the host vehicle so as to output the information to the ECU 1 and the navigation system 6.

The internal sensor unit 3 includes a velocity sensor or a yaw angle sensor (not shown) for acquiring a velocity or a yaw angle of the host vehicle so as to output the velocity and the yaw angle to the ECU 1 and the navigation system 6.

The GPS electric-wave reception unit 4 receives electric waves from three or more GPS satellites to acquire positional information indicating a position of the host vehicle, so as to output the positional information to the ECU 1 and the navigation system 6.

The map database 5 stores map information on an area in which the host vehicle is to travel so that the ECU 1 and the navigation system 6 refer to the map information. The map information includes information on positions of roads and intersections. Examples of intersections include a crossroads, a T-junction, and a circular intersection referred to as a roundabout.

The term "roundabout" refers to an intersection which is a circular road (loop road) in which three or more roads join up. Hereinafter, the roundabout refers to a loop road. The map information includes information on a roundabout. The information on a roundabout includes a traveling direction of the vehicle in the roundabout (clockwise direction or counterclockwise direction), and points in the roundabout at which plural roads join up.

The navigation system 6 is a device for guiding the host vehicle to a destination set by an occupant such as a driver. The navigation system 6 estimates a position of the host vehicle based on each piece of information output from the external sensor unit 2, the internal sensor unit 3, and the GPS electric-wave reception unit 4, calculates a presumed traveling route to a destination, and guides the host vehicle to the destination. The navigation system 6 outputs the information on the presumed traveling route to the ECU 1.

The ECU 1 includes a vehicle position estimation unit 11 and a direction indicator control unit 12.

The vehicle position estimation unit 11 estimates a position of the host vehicle based on each piece of information output from the external sensor unit 2, the internal sensor unit 3, and the GPS electric-wave reception unit 4. The direction indicator control unit 12 includes a determination unit (determination circuit) 121 for determining whether there is any roundabout along the presumed traveling route on which the host vehicle is to travel, and a control unit (control circuit) 122 for inhibiting directional indication made by the direction indicators (7A, 7B) of the host vehicle upon the entrance of the roundabout determined to be present on the presumed traveling route.

The control unit 122 of the direction indicator control unit 12 controls the vehicle exterior direction indicator 7A and the vehicle interior direction indicator 7B in accordance with the positional information of the host vehicle acquired by the vehicle position estimation unit 11, the map information in the map database 5, and the information on the presumed traveling route generated by the navigation system 6.

The vehicle exterior direction indicator 7A includes a right-turn signal and a left-turn signal installed in external parts of the host vehicle for indicating a right turn or a left turn of the host vehicle to other vehicles or pedestrians.

The vehicle interior direction indicator 7B includes a right-turn signal and a left-turn signal installed in the compartment of the host vehicle for indicating the right turn or the left turn to the occupant such as the driver.

The direction indicator control unit 12 controls the vehicle exterior direction indicator 7A and the vehicle interior direction indicator 7B so as to turn on the respective right-turn signals while the respective left-turn signals are in the OFF state. Similarly, the direction indicator control unit 12 controls the vehicle exterior direction indicator 7A and the vehicle interior direction indicator 7B so as to turn on the respective left-turn signals while the respective right-turn signals are in the OFF state. The vehicle exterior direction indicator 7A and the vehicle interior direction indicator 7B are thus operated synchronously.

The embodiment is further described below with reference to the flowcharts. The following is control processing according to the embodiment in a case in which the direction indicators are presumed to be controlled so as to provide the directional indication toward a direction in which the vehicle is to travel when the vehicle is entering a point at which roads join together. For example, when the presumed traveling route includes an intersection at which the host vehicle is to turn to the right, the directional indicators on the right side are automatically operated in front of the intersection.

First Example

A first example of a direction indicator control method executed by the direction indicator control unit 12 is described below with reference to the flowcharts shown in FIG. 2 and FIG. 3. The direction indicator control unit 12 executes the processing shown in FIG. 2 and FIG. 3 successively on the presumed traveling route. The first example is illustrated with a case in which the host vehicle is traveling in accordance with the guidance by the navigation system 6 based on the information on the presumed traveling route. The first example uses a directional indication execution flag f1 and a directional indication inhibition flag f2, both being switched between the ON and OFF states.

The control unit 122 of the direction indicator control unit 12 preliminarily acquires, from the map information, locations of points on the presumed traveling route which need to be determined whether the directional indication should be made (hereinafter referred to as "directional indication determination points"). For example, a crossroads or a T-junction includes a single directional indication determination point at which the respective roads join with each other. A roundabout includes a plurality of directional indication determination points at which the respective roads join up into the roundabout.

Figure 4:
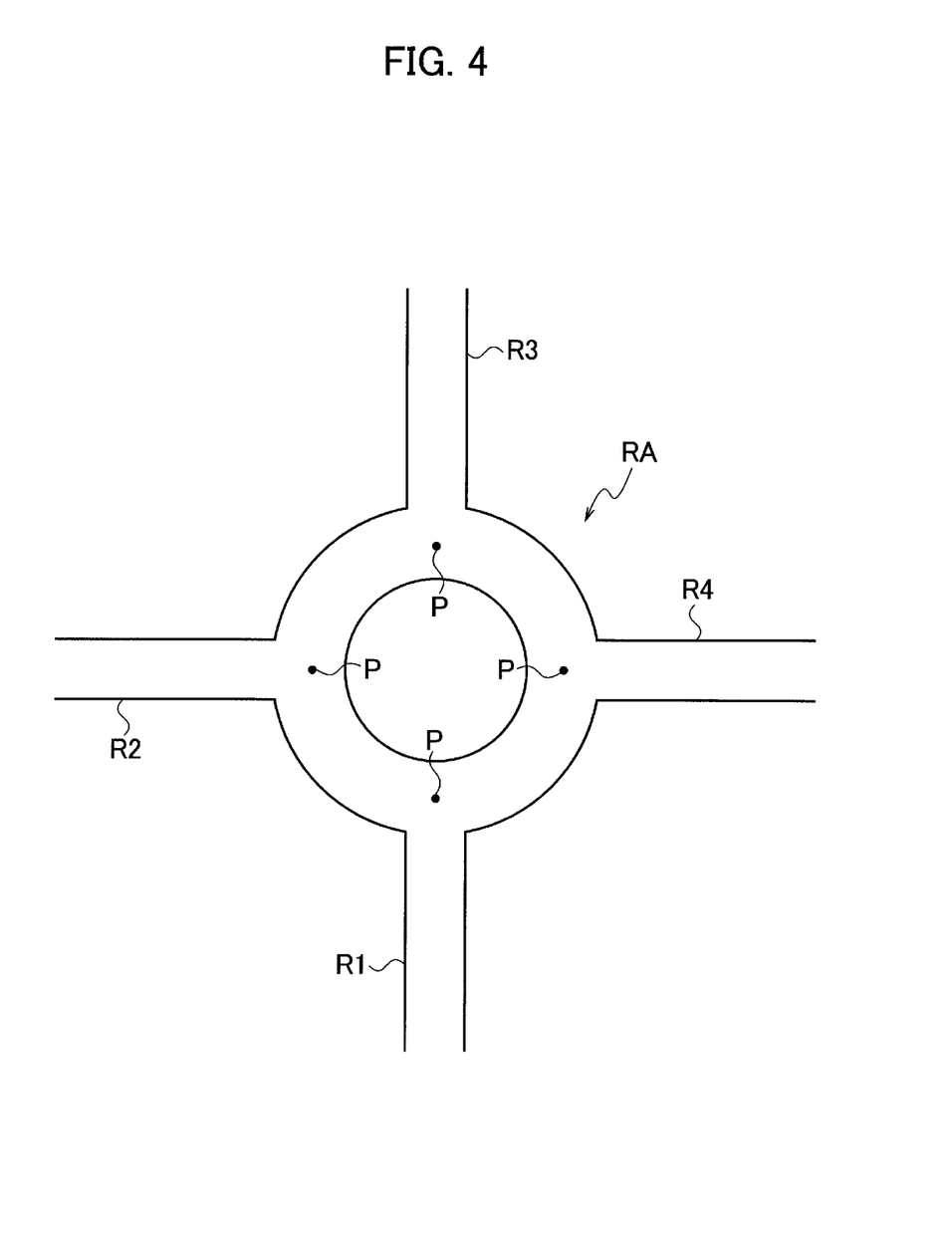
FIG. 4 is a diagram illustrating an example of direction indication determination points at a roundabout.

FIG. 4 illustrates a case in which roads R1 to R4 join in a roundabout RA. This roundabout RA includes directional indication determination points P at which the respective road R1, R2, R3, and R4 join up.

The control unit 122 of the direction indicator control unit 12 preliminarily acquires the information on the roundabout on the presumed traveling route from the map information.

The control unit 122 of the direction indicator control unit 12 obtains locations of an exit road, an exit road joint point, an adjacent road, and an adjacent road joint point described below, based on the information on the roundabout and the information on the presumed traveling route.

As used herein, the term "exit road" refers to a road to which the host vehicle is to exit from the roundabout, and the term "adjacent road" refers to a road adjacent to the exit road in the opposite direction of the traveling direction in the roundabout. The term "exit road joint point" refers to a point at which the exit road joins with the roundabout, and the term "adjacent road joint point" refers to a point at which the adjacent road joins with the roundabout. The exit road joint point is one of the directional indication determination points which is connected with the exit road. The adjacent road joint point is one of the directional indication determination points which is connected with the adjacent road.

The exit road joint point and the adjacent road joint point are typically referred to as nodes which are joint points at which the respective roads (links) join together.

The exit road joint point and the adjacent road joint point may also be obtained in accordance with the positions of the corresponding exit and adjacent roads designated by the occupant of the host vehicle.

Figure 2:
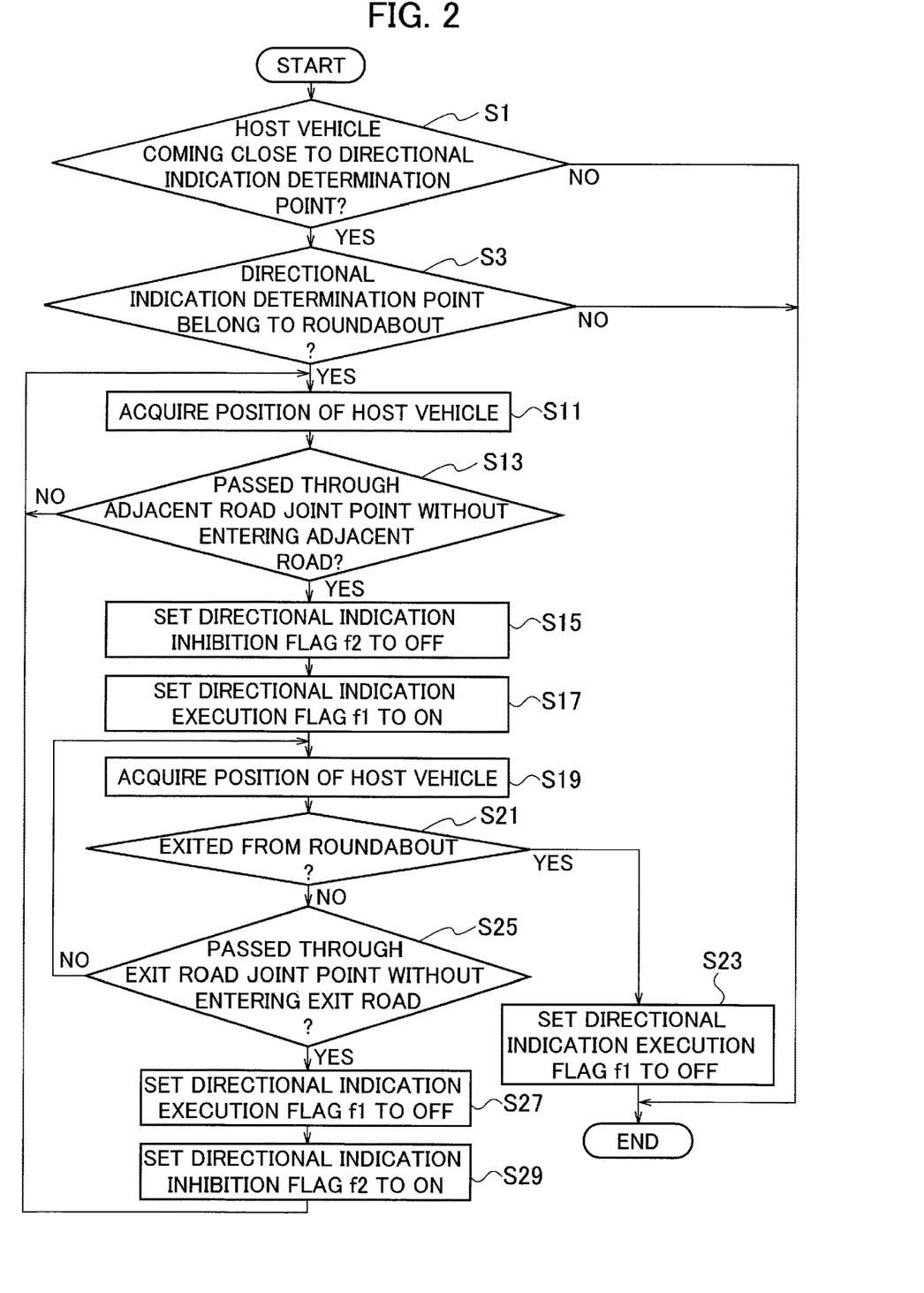
FIG. 2 is the first flowchart for explaining a direction indicator control method of a first example.

As shown in FIG. 2, first, the direction indicator control unit 12 determines whether the host vehicle is coming close to a directional indication determination point in accordance with the position of the host vehicle estimated by the vehicle position estimation unit 11 and the position of the directional indication determination point (S1). The process ends when the host vehicle is still not close to the directional indication determination point (S1: NO).

When the host vehicle is coming close to the directional indication determination point (S1: YES), the determination unit 121 of the direction indicator control unit 12 determines whether the directional indication determination point belongs to a roundabout (S3). Namely, the determination unit 121 determines whether a roundabout is present along the presumed traveling route on which the host vehicle is presumed to travel. The process ends when the directional indication determination point does not belong to the roundabout (S3: NO).

When the directional indication determination point belongs to the roundabout (S3: YES), the control unit 122 of the direction indicator control unit 12 acquires the latest position of the host vehicle estimated by the vehicle position estimation unit 11 (S11), and determines whether the host vehicle has passed through the adjacent road joint point without entering the adjacent road, in accordance with the position of the host vehicle, the position of the adjacent road, and the position of the adjacent road joint point (S13). The process returns to step S11 when the host vehicle has not entered the adjacent road or has not passed through the adjacent road joint point (S13: NO).

When the host vehicle has passed through the adjacent road joint point without entering the adjacent road (S13: YES), the control unit 122 of the direction indicator control unit 12 sets the directional indication inhibition flag f2 to be OFF (S15), and sets the directional indication execution flag f1 to be ON (S17).

The control unit 122 of the direction indicator control unit 12 then acquires the latest position of the host vehicle estimated by the vehicle position estimation unit 11 (S19), and determines whether the host vehicle has exited from the roundabout in accordance with the information on the roundabout and the position of the host vehicle (S21). Namely, the control unit 122 of the direction indicator control unit 12 determines whether the host vehicle has entered any one of the roads belonging to the roundabout or is still traveling in the roundabout (S21).

When the host vehicle has entered any one of the roads (S21: YES), the control unit 122 of the direction indicator control unit 12 sets the directional indication execution flag f1 to be OFF (S23) to end the process.

When the host vehicle has not exited from the roundabout yet (S21: NO), the control unit 122 of the direction indicator control unit 12 determines whether the host vehicle has passed through the exit road joint point without entering the exit road in accordance with the position of the host vehicle, the position of the exit road, and the position of the exit road joint point (S25). The process returns to step S19 when the host vehicle has not entered the exit road or has not passed through the exit road joint point (S25: NO).

When the host vehicle has passed through the exit road joint point without entering the exit road (S25: YES), the control unit 122 of the direction indicator control unit 12 sets the directional indication execution flag f1 to be OFF (S27) and the directional indication inhibition flag f2 to be ON (S29), and the process returns to step 11.

Figure 3:
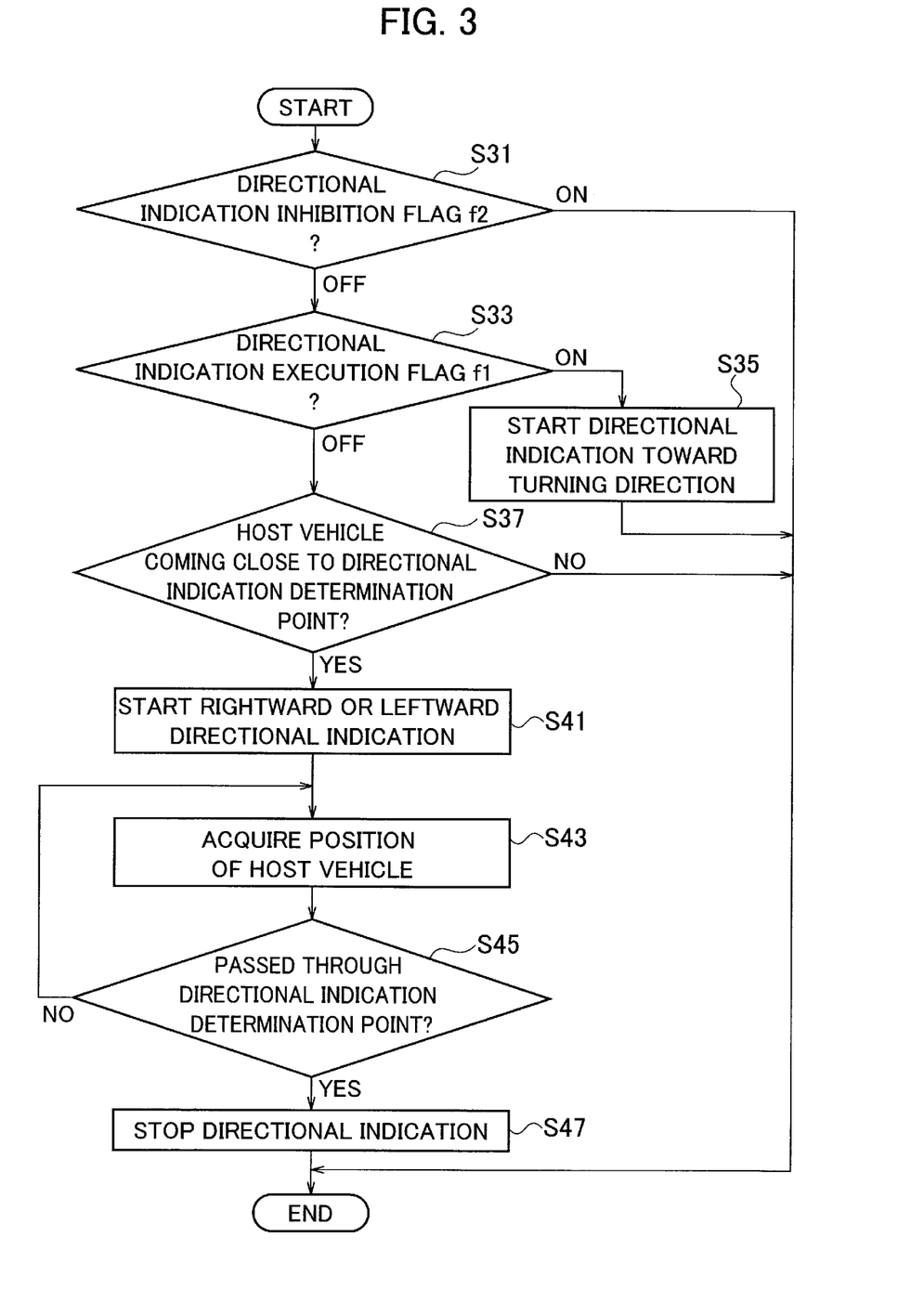
FIG. 3 is the second flowchart for explaining the direction indicator control method of the first example.

The direction indicator control unit 12 also controls the vehicle exterior direction indicator 7A and the vehicle interior direction indicator 7B in accordance with the directional indication execution flag f1 and the directional indication inhibition flag f2, as shown in FIG. 3, instead of the processing shown in FIG. 2.

As shown in FIG. 3, the control unit 122 of the direction indicator control unit 12 determines whether the directional indication inhibition flag f2 is set to ON or OFF (S31), and the process ends when set to ON (S31: ON).

When the directional indication inhibition flag f2 is set to OFF (S31: OFF), the control unit 122 of the direction indicator control unit 12 determines whether the directional indication execution flag f1 is set to ON or OFF (S33). The process proceeds to step S35 when the directional indication execution flag f1 is set to ON.

In step S35, when the vehicle exterior direction indicator 7A and the vehicle interior direction indicator 7B make no directional indication, the control unit 122 of the direction indicator control unit 12 directs the vehicle exterior direction indicator 7A and the vehicle interior direction indicator 7B to start the directional indication toward the direction to which the host vehicle is to turn when exiting from the roundabout (S35) to end the process.

The direction to which the vehicle is to turn when exiting from the roundabout is hereinafter referred to as a "turning direction". Namely, the turning direction is a direction in which the vehicle is to turn to enter the exit road from the roundabout.

The turning direction is the leftward direction when the traveling direction is the clockwise direction, while the turning direction is the rightward direction when the traveling direction is the counterclockwise direction. The vehicle exterior direction indicator 7A and the vehicle interior direction indicator 7B turn on the left-turn signals when the traveling direction is the clockwise direction, or turn on the right-turn signal when the traveling direction is the counterclockwise direction in step S35 when not starting the directional indication yet.

When the directional indication execution flag f1 is set to OFF (S33: OFF), the control unit 122 of the direction indicator control unit 12 determines whether the host vehicle is coming close to the directional indication determination point (S37), in the same manner as step S1. The process ends when the host vehicle is still not close to the directional indication determination point (S37: NO).

When the host vehicle is coming close to the directional indication determination point (S37: YES), the control unit 122 of the direction indicator control unit 12 directs the vehicle exterior direction indicator 7A and the vehicle interior direction indicator 7B to start the rightward or leftward directional indication (S41). In particular, the control unit 122 of the direction indicator control unit 12 directs the respective direction indicators to start the rightward directional indication when turning to the right or start the leftward directional indication when turning to the left at the intersection, in accordance with the information on the presumed traveling route (S41). The vehicle exterior direction indicator 7A and the vehicle interior direction indicator 7B turn on the right-turn signals when turning to the right or turn on the left-turn signals when turning to the left at the intersection.

The control unit 122 of the direction indicator control unit 12 then acquires the latest position of the host vehicle estimated by the vehicle position estimation unit 11 (S43), and determines whether the host vehicle has passed through the directional indication determination point (S45). The process returns to step S43 when the host vehicle has not passed through the directional indication determination point yet (S45: NO).

When the host vehicle has passed through the directional indication determination point (S45: YES), the control unit 122 of the direction indicator control unit 12 directs the vehicle exterior direction indicator 7A and the vehicle interior direction indicator 7B to stop the directional indication (S47) to end the process.

Second Example

A second example of a direction indicator control method executed by the direction indicator control unit 12 is described below with reference to the flowcharts shown in FIG. 5 and FIG. 6. The direction indicator control unit 12 executes the processing shown in FIG. 5 and FIG. 6 successively on the presumed traveling route. The second example is also illustrated with the case in which the host vehicle is traveling in accordance with the guidance by the navigation system 6 based on the information on the presumed traveling route. The second embodiment, however, does not use either the directional indication execution flag f1 or the directional indication inhibition flag f2. The vehicle exterior direction indicator 7A and the vehicle interior direction indicator 7B are presumed not to make any directional indication at the beginning. The steps with the same control processing as in the first example are indicated by the same reference numerals.

Figure 5:
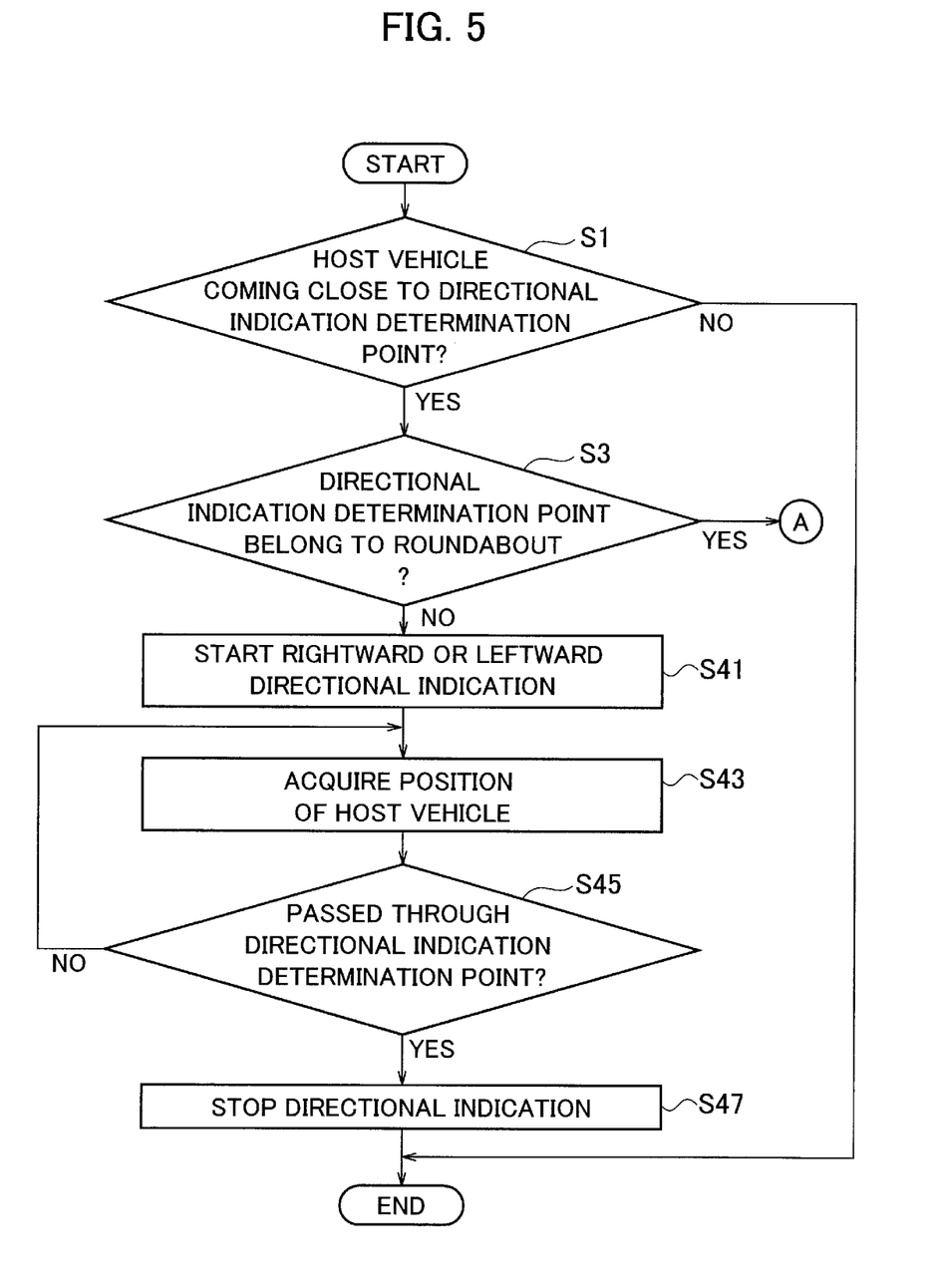
FIG. 5 is the first flowchart for explaining a direction indicator control method of a second example.
Figure 6:
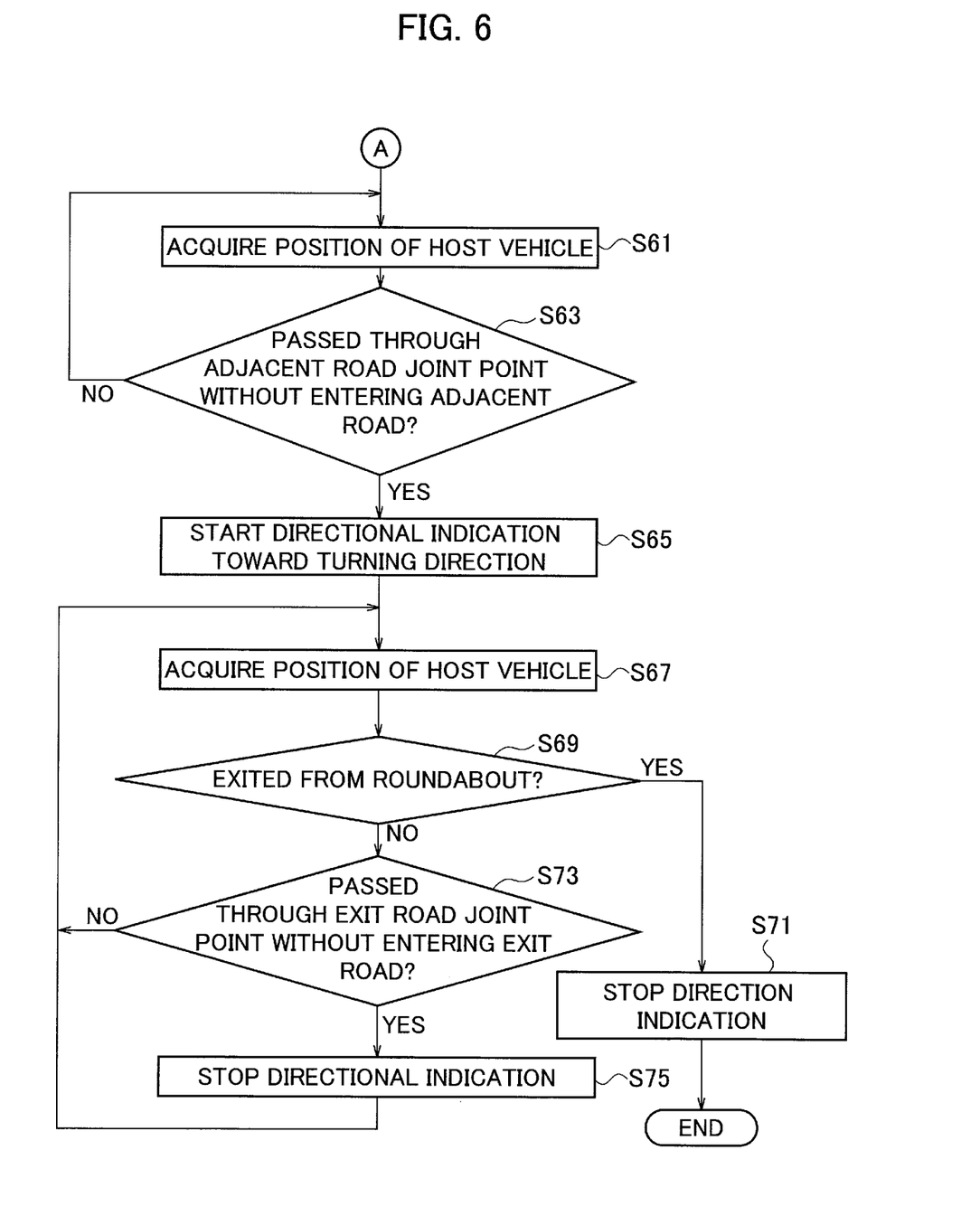
FIG. 6 is the second flowchart for explaining the direction indicator control method of the second example.

As shown in FIG. 5, first, the direction indicator control unit 12 determines whether the host vehicle is coming close to a directional indication determination point in accordance with the position of the host vehicle estimated by the vehicle position estimation unit 11 and the position of the directional indication determination point (S1). The process ends when the host vehicle is still not close to the directional indication determination point (S1: NO).

When the host vehicle is coming close to the directional indication determination point (S1: YES), the determination unit 121 of the direction indicator control unit 12 determines whether the directional indication determination point belongs to a roundabout (S3). Namely, the determination unit 121 determines whether a roundabout is present along the presumed traveling route on which the host vehicle is presumed to travel.

When the directional indication determination point does not belong to the roundabout (S3: NO), the control unit 122 of the direction indicator control unit 12 directs the vehicle exterior direction indicator 7A and the vehicle interior direction indicator 7B to start the rightward or leftward directional indication (S41).

The control unit 122 of the direction indicator control unit 12 then acquires the latest position of the host vehicle estimated by the vehicle position estimation unit 11 (S43), and determines whether the host vehicle has passed through the directional indication determination point (S45). The process returns to step S43 when the host vehicle has not passed through the directional indication determination point yet (S45: NO).

When the host vehicle has passed through the directional indication determination point (S45: YES), the control unit 122 of the direction indicator control unit 12 directs the vehicle exterior direction indicator 7A and the vehicle interior direction indicator 7B to stop the directional indication (S47) to end the process.

When the directional indication determination point belongs to the roundabout (S3: YES), the control unit 122 of the direction indicator control unit 12 acquires the latest position of the host vehicle estimated by the vehicle position estimation unit 11 (S61), as shown in FIG. 6. The control unit 122 of the direction indicator control unit 12 then determines whether the host vehicle has passed through the adjacent road joint point without entering the adjacent road, in accordance with the position of the host vehicle, the position of the adjacent road, and the position of the adjacent road joint point (S63). The process returns to step S61 when the host vehicle has not entered the adjacent road or has not passed through the adjacent road joint point (S63: NO).

When the host vehicle has passed through the adjacent road joint point without entering the adjacent road (S63: YES), the control unit 122 of the direction indicator control unit 12 directs the respective direction indicators to start the directional indication toward the turning direction (S65).

The control unit 122 of the direction indicator control unit 12 then acquires the latest position of the host vehicle estimated by the vehicle position estimation unit 11 (S67), and determines whether the host vehicle has exited from the roundabout in accordance with the information on the roundabout and the position of the host vehicle (S69).

When the host vehicle has exited from the roundabout (S69: YES), the control unit 122 of the direction indicator control unit 12 directs the vehicle exterior direction indicator 7A and the vehicle interior direction indicator 7B to stop the directional indication (S71) to end the process.

When the host vehicle has not exited from the roundabout yet (S69: NO), the control unit 122 of the direction indicator control unit 12 determines whether the host vehicle has passed through the exit road joint point without entering the exit road in accordance with the position of the host vehicle, the position of the exit road, and the position of the exit road joint point (S73). The process returns to step S67 when the host vehicle has not entered the exit road or has not passed through the exit road joint point (S73: NO).

When the host vehicle has passed through the exit road joint point without entering the exit road (S73: YES), the control unit 122 of the direction indicator control unit 12 directs the vehicle exterior direction indicator 7A and the vehicle interior direction indicator 7B to stop the directional indication (S75), and the process returns to step S67.

Specific examples of the directional indication in a roundabout are described below with reference to FIG. 7 and FIG. 8.

Figure 7:
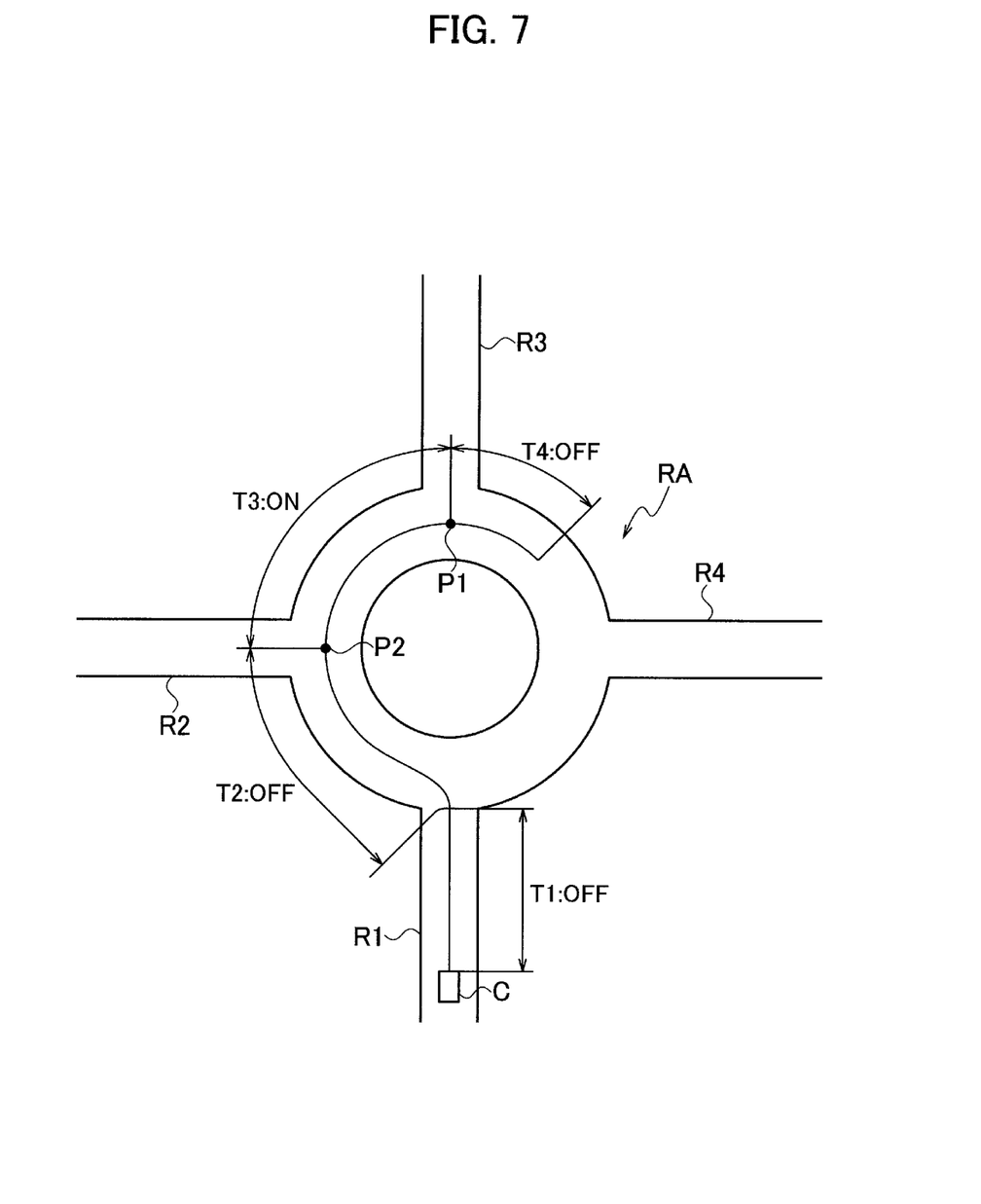
FIG. 7 is a diagram illustrating a first specific example of directional indication at a roundabout.

FIG. 7 illustrates the case in which the roads R1 to R4 join in the roundabout RA. The traveling direction in the roundabout is presumed to be the clockwise direction. The road R2 is presumed to be the adjacent road, and the road R3 is presumed to be the exit road. Reference sign P1 refers to a point at which the exit road joins with the roundabout RA, which is the exit road joint point. Reference sign P2 refers to a point at which the adjacent road joins with the roundabout RA, which is the adjacent road joint point.

The directional indication is not made in a section T1 before the host vehicle C enters the roundabout RA (T1: OFF). The directional indication is not made in a section T2 between the point at which the host vehicle C enters the roundabout RA and the adjacent road joint point P2 either (T2: OFF).

The leftward directional indication is started when the host vehicle C passes through the adjacent road joint point P2 without entering the adjacent road (R2), and is stopped when the host vehicle C passes through the exit road joint point P1. Namely, the directional indication is made in a section T3 between the adjacent road joint point P2 and the exit road joint point P1 (T3: ON).

The directional indication is not made when the host vehicle C does not enter the exit road (R3), namely does not exit from the roundabout RA but is still circuiting, for example, during a section T4 after passing through the exit road joint point P1 (T4: OFF).

Although not shown, the directional indication is started after the host vehicle C again passes through the adjacent road joint point P2 without entering the adjacent road (R2), and is stopped when the host vehicle C again passes through the exit road joint point P1.

The directional indication is also stopped when the host vehicle C enters the exit road (R3), namely exits from the roundabout RA, since the host vehicle C has passed through the exit road joint point P1.

Figure 8:
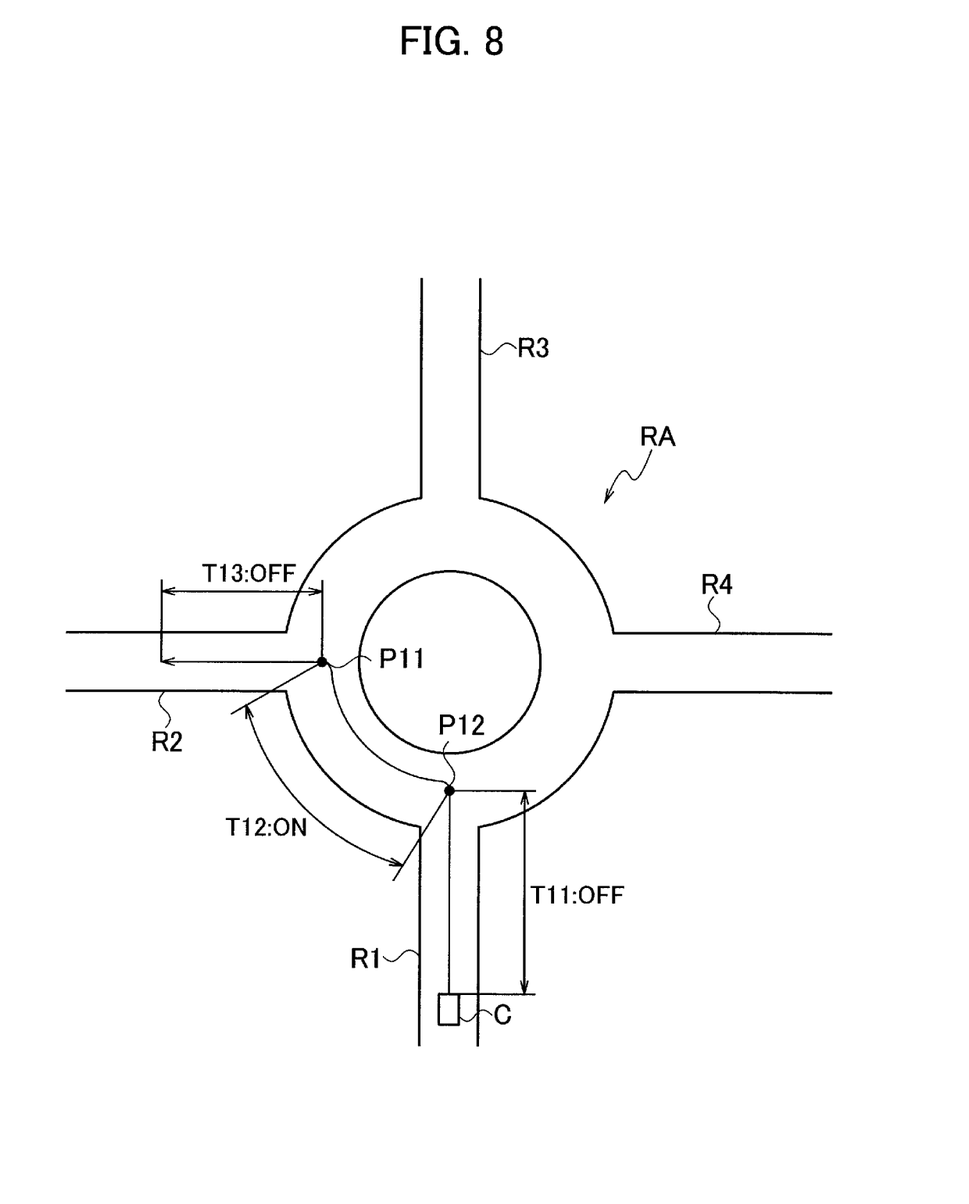
FIG. 8 is a diagram illustrating a second specific example of directional indication at a roundabout.

As shown in FIG. 8, the road R1 joining with the roundabout RA is presumed to be the adjacent road, and the road R2 is presumed to be the exit road. Reference sign P11 refers to a point at which the exit road joins with the roundabout RA, which is the exit road joint point. Reference sign P12 refers to a point at which the adjacent road joins with the roundabout RA, which is the adjacent road joint point.

Differing from the case shown in FIG. 7, the host vehicle C enters the roundabout RA through the adjacent road (R1). The directional indication is not made in a section T11 before the host vehicle C enters the roundabout RA (T11: OFF).

The host vehicle C passes through the adjacent road joint point P12 once entering the roundabout RA. The host vehicle C is not in the adjacent road (R1) at this point. The leftward directional indication is thus started, and is then stopped when the host vehicle C passes through the exit road joint point P11. Namely, the directional indication is made in a section T12 between the adjacent road joint point P12 and the exit road joint point P11 (T12: ON).

The directional indication is not made when the host vehicle C enters the exit road (R2), namely exits the roundabout RA, during a section T13 (T13: OFF).

The directional indication is stopped when the host vehicle C does not enter the exit road (R2), namely, does not exit from the roundabout RA but is still circuiting, as in the case shown in FIG. 7, since the host vehicle C has passed through the exit road joint point P11. The directional indication is started after the host vehicle C again passes through the adjacent road joint point P12 without entering the adjacent road (R1), and is stopped when the host vehicle C again passes through the exit road joint point P11.

While FIG. 7 and FIG. 8 illustrate the specific examples in which the host vehicle is traveling in the roundabout in the clockwise direction and the directional indication is made in the leftward direction, the directional indication will be made in the rightward direction when the host vehicle is traveling in the roundabout in the counterclockwise direction.

The present embodiment has exemplified the case in which the direction indicator control device is mounted on the vehicle as a target for executing the directional indication. Alternatively, the direction indicator control device may be mounted on a server capable of communicating with the target vehicle, or mounted on any other vehicle not a target vehicle, so as to communicate necessary information and instructions between the server or any other vehicle and the target vehicle so as to remotely follow the similar direction indicator control method. The server and the target vehicle can communicate with each other through radio communication or vehicle-to-infrastructure communication. Any other vehicle and the target vehicle can communicate with each other through vehicle-to-vehicle communication. The direction indicators may blink when the control circuit is ON (turned on), and may be switched off when the control circuit is OFF. For example, the control circuit may be set to be turned off or keep the OFF state when the vehicle enters a roundabout.

The present embodiment described above determines whether there is a roundabout on a presumed traveling route, and inhibits the directional indication by the direction indicators when the vehicle enters the roundabout determined to be present. The present embodiment thus enables the directional indication following the rules of the roundabout for making the directional indication after entering the roundabout. Namely, the present embodiment can avoid the entrance to the roundabout while making any directional indication.

The present embodiment also obtains the position of the adjacent road adjacent to the exit road in the opposite direction of the traveling direction and the position of the adjacent road joint point, determines whether the host vehicle has passed through the adjacent road joint point without entering the adjacent road, and directs the direction indicators to start the directional indication toward the turning direction when the host vehicle is determined to have passed through the point. The present embodiment thus enables the respective direction indicators to follow the rules of the roundabout to start the directional indication toward the turning direction when the host vehicle has passed through the adjacent road joint point without entering the adjacent road. Namely, the present embodiment can prevent the host vehicle from passing through the adjacent road joint point and keeping traveling in the roundabout without making any directional indication or while wrongly making the directional indication toward the direction opposite to the turning direction.

The present embodiment also obtains the position of the exit road and the position of the exit road joint point, determines whether the host vehicle has passed through the exit road joint point without entering the exit road, and directs the direction indicators to stop the directional indication when the host vehicle is determined to have passed through the exit road joint point without entering the exit road. The present embodiment thus enables the respective direction indicators to follow the rules of the roundabout to stop the directional indication when the host vehicle has passed through the exit road joint point without entering the exit road. Namely, the present embodiment can prevent the host vehicle from passing through the exit road joint point and keeping traveling in the roundabout while making any directional indication.

While the embodiment of the present invention has been described above, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

1 ECU
2 EXTERNAL SENSOR UNIT
3 INTERNAL SENSOR UNIT
4 GPS ELECTRIC-WAVE RECEPTION UNIT
5 MAP DATABASE
6 NAVIGATION SYSTEM
7A VEHICLE EXTERIOR DIRECTION INDICATOR (DIRECTION INDICATOR)
7B VEHICLE INTERIOR DIRECTION INDICATOR (DIRECTION INDICATOR)
11 VEHICLE POSITION ESTIMATION UNIT
12 DIRECTION INDICATOR CONTROL UNIT
121 DETERMINATION UNIT
122 CONTROL UNIT
C HOST VEHICLE
f1 DIRECTIONAL INDICATION EXECUTION FLAG
f2 DIRECTIONAL INDICATION INHIBITION FLAG
RA ROUNDABOUT
R1 to R4 ROAD
P1, P11 EXIT ROAD JOINT POINT
P2, P12 ADJACENT ROAD JOINT POINT

The invention claimed is:

1. A direction indicator control method comprising:
acquiring each position of a plurality of directional indication determination points to be determined whether a directional indication should be made on a presumed traveling route on which a vehicle is presumed to travel;
determining whether one of the directional indication determination points belongs to a roundabout when the vehicle is coming close to the corresponding directional indication determination point; and
inhibiting a direction indicator of the vehicle from making the directional indication when the vehicle enters the roundabout when the corresponding directional indication determination point to which the vehicle is coming close is determined to belong to the roundabout.

2. The direction indicator control method according to claim 1, further comprising:
obtaining a position of an adjacent road adjacent to, in an opposite direction of a traveling direction in the roundabout, an exit road through which the vehicle exits from the roundabout, and a position of an adjacent road joint point at which the adjacent road joins with the roundabout, and determining whether the vehicle has passed through the adjacent road joint point without entering the adjacent road; and directing the direction indicator to start the directional indication toward a direction in which the vehicle turns to exit from the roundabout when the vehicle is determined to have passed through the adjacent road joint point without entering the adjacent road.

3. The direction indicator control method according to claim 2, further comprising:

obtaining a position of the exit road and a position of an exit road joint point at which the exit road joins with the roundabout, and determining whether the host vehicle has passed through the exit road joint point without entering the exit road; and directing the direction indicator to stop the directional indication when the host vehicle is determined to have passed through the exit road joint point without entering the exit road.

4. The direction indicator control method according to claim 1, wherein a direction of the directional indication is reversely switched between a case in which a traveling direction in the roundabout is a clockwise direction and a case in which the traveling direction is a counterclockwise direction.

5. The direction indicator control method according to claim 1, further comprising directing the direction indicator to start the directional indication toward the direction in which the vehicle turns to exit from the roundabout when the vehicle is determined to have passed again through the adjacent road joint point without entering the adjacent road.

6. A direction indicator control device comprising:
a direction indicator installed in a vehicle;
a control circuit configured to acquire each position of a plurality of directional indication determination points to be determined whether a directional indication should be made on a presumed traveling route on which the vehicle is presumed to travel; and
a determination unit configured to determine whether one of the directional indication determination points acquired by the control circuit belongs to a roundabout when the vehicle is coming close to the corresponding directional indication determination point, the control circuit being configured to inhibit the direction indicator of the vehicle from making the directional indication when the vehicle enters the roundabout when the determination unit determines that the corresponding directional indication determination point to which the vehicle is coming close belongs to the roundabout.

7. A direction indicator control device comprising:
a direction indicator installed in a vehicle;
a control circuit configured to acquire each position of a plurality of directional indication determination points to be determined whether a directional indication should be made on a presumed traveling route on which the vehicle is presumed to travel; and
a determination unit configured to determine whether one of the directional indication determination points acquired by the control circuit belongs to a roundabout when the vehicle is coming close to the corresponding directional indication determination point, the control circuit being configured to direct the direction indicator to make the directional indication toward a direction in which the vehicle is to travel when the vehicle enters a point at which roads join up, the direction indicator being controlled to blink when the control circuit is turned on, and controlled to be switched off when the control circuit is turned off, the control circuit being set to be turned off or keep an off state when the vehicle enters the roundabout.

8. A direction indicator control method comprising:
acquiring a position of a directional indication determination point to be determined whether a directional indication should be made along a presumed traveling route on which a vehicle is presumed to travel;
determining whether the directional indication determination point belongs to a roundabout to which the vehicle is coming close; and
inhibiting a direction indicator of the vehicle from making the directional indication when the vehicle enters the roundabout when the directional indication determination point to which the vehicle is coming close is determined to belong to the roundabout.

* * * * *